(12) United States Patent
Wang et al.

(10) Patent No.: US 12,032,991 B2
(45) Date of Patent: Jul. 9, 2024

(54) CONTINUOUS LIVENESS AND INTEGRITY OF APPLICATIONS DURING MIGRATION

(71) Applicant: International Business Machines Corporation, Armonk, NY (US)

(72) Inventors: Yue Wang, Beijing (CN); Xin Peng Liu, Beijing (CN); Biao Chai, Beijing (CN); Shuang Men, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 17/305,344

(22) Filed: Jul. 6, 2021

(65) Prior Publication Data

US 2023/0009930 A1  Jan. 12, 2023

(51) Int. Cl.
  *G06F 9/48*  (2006.01)
  *G06F 9/54*  (2006.01)
  *G06F 13/36*  (2006.01)

(52) U.S. Cl.
  CPC ............ *G06F 9/4856* (2013.01); *G06F 9/547* (2013.01); *G06F 13/36* (2013.01); *G06F 2209/482* (2013.01)

(58) Field of Classification Search
  CPC ........ G06F 9/4856; G06F 9/547; G06F 13/36; G06F 2209/482; G06F 9/5088; G06F 9/5027; G06F 3/0605; H04L 41/0895; H04L 47/783
  See application file for complete search history.

(56) References Cited

U.S. PATENT DOCUMENTS

| 10,083,026 | B1* | 9/2018 | Venkata ................... G06F 8/656 |
| 11,089,064 | B1* | 8/2021 | Sarukkai ............. H04L 41/0894 |
| 2009/0049438 | A1 | 2/2009 | Draper et al. |
| 2012/0151061 | A1 | 6/2012 | Bartfai-Walcott et al. |
| 2018/0241642 | A1 | 8/2018 | Patel et al. |

(Continued)

FOREIGN PATENT DOCUMENTS

| CN | 104468759 A | 3/2015 |
| CN | 109697114 A | 4/2019 |
| CN | 112153098 A | 12/2020 |

OTHER PUBLICATIONS

PCT International Search Report and Written Opinion, dated Aug. 9, 2022, regarding Application No. PCT/CN2022/094602, 9 pages.

(Continued)

*Primary Examiner* — Kenneth Tang
(74) *Attorney, Agent, or Firm* — Yee & Associates, P.C.

(57) ABSTRACT

Managing application migration is provided. An API server on a controller node is invoked to update a configuration map of a reverse proxy on a worker node for the reverse proxy to route user service requests corresponding to unmigrated applications of a set of applications from a first computing platform to a second computing platform to maintain liveness of the unmigrated applications during migration. The API server is invoked to build an image for an application of the set of applications based on source code of the application obtained from the second computing platform. The API server is invoked to generate a pod on the worker node to perform a workload of the application using the image. The API server is invoked to update a service on the worker node to select the pod on the worker node performing the workload of the application.

20 Claims, 7 Drawing Sheets

(56) References Cited

U.S. PATENT DOCUMENTS

| | | | |
|---|---|---|---|
| 2018/0287883 A1* | 10/2018 | Joshi | G06F 9/455 |
| 2018/0324204 A1* | 11/2018 | McClory | G06F 9/5027 |
| 2019/0121662 A1 | 4/2019 | Zhao et al. | |
| 2021/0397729 A1* | 12/2021 | McQuaid | G06F 21/6218 |
| 2022/0124147 A1 | 4/2022 | Ge et al. | |
| 2022/0200869 A1* | 6/2022 | Erlingsson | H04L 67/10 |
| 2023/0259570 A1* | 8/2023 | Shribman | G06F 9/547 709/217 |

OTHER PUBLICATIONS

Thiessen et al., "Cloud Foundry Migration Tool," GitHub, Inc., Copyright 2021, 5 pages. https://github.com/IBM-cloud-architecture/cf-transformation.

Nakajo, "How to Migrate Cloud Foundry Applications to Docker Containers on a Kubernetes Cluster," IBM Corporation, Mar. 2, 2020, 20 pages. https://www.IBM.com/cloud/blog/migrate-cloud-foundry-applications-to-docker-containers-on-a-kubernetes-cluster.

Erwin et al., "Migration of an Enterprise UI Microservice System from Cloud Foundry to Kubernetes," The Linux Foundation, Open Source Summit Japan, Jun. 21, 2018, 28 pages. https://events19.linuxfoundation.org/wp-content/uploads/2017/11/Migration-of-an-Enterprise-UI-Microservice-System-from-Cloud-Foundry-to-Kubernetes-OSS-Tony-Erwin-Jonathan-Schweikhart.pdf.

Irnich, "Moving a Cloud Foundry Hello World App to Kubernetes: How Hard Can It Be?," SUSE, Mar. 17, 2021, 12 pages. https://www.suse.com/c/moving-a-cloud-foundry-hello-world-app-to-kubernetes-src/.

"Cloud Foundry Packaged for Kubernetes," Cloud Foundry Inc., Copyright 2021, Accessed Jun. 11, 2021, 4 pages. https://www.cloudfoundry.org/technology/kubecf/.

"Performing a Rolling Update," Feb. 4, 2020, The Linux Foundation, Copyright 2021, 2 pages. https://kubernetes.io/docs/tutorials/kubernetes-basics/update/update-intro/.

Mell et al., "The NIST Definition of Cloud Computing", Computer Security Division, National Institute of Standards and Technology, Jan. 2011, 7 pages.

* cited by examiner

CONTINUOUS LIVENESS AND INTEGRITY OF APPLICATIONS DURING MIGRATION

BACKGROUND

1. Field

The disclosure relates generally to application migration and more specifically to migrating a set of applications corresponding to a customer entity from a cloud application platform to a container orchestration platform while maintaining continuous liveness and integrity of the set of customer entity applications during the migration process.

2. Description of the Related Art

Application migration is the process of moving a software application or program from a first computing environment to a second computing environment. Examples may include migration of an application from an on-premises enterprise datacenter to a cloud environment or from one cloud environment to another cloud environment.

Customers wanting to migrate their applications to a new computing environment can experience application downtime and service interruption during the migration process due to differences in the source and target computing environments. In addition, if a customer wants to migrate a large number of applications, then the customer will experience a long application downtime making it impossible to provide services to users until the entire migration process is finished due to the differences in environments.

For example, if a customer wants to migrate all of the customer's applications from a cloud application platform, such as, for example, Cloud Foundry® (a registered trademark of the Linux Foundation of San Francisco, California), to a container orchestration platform, such as, for example, Kubernetes® (a registered trademark of the Linux Foundation of San Francisco, California), then the customer can experience difficulties, such as, for example, application downtime, service interruptions, and the like, during the migration process. One current solution is to link the customer's applications on the cloud application platform with the container orchestration environment using a plurality of traffic routing proxies, such as, for example, Envoy® (a registered trademark of the Linux Foundation of San Francisco, California). Based on this connectivity, application migration from the cloud application platform to the container orchestration platform can be performed by leveraging traffic routing proxy rules. However, an issue with this solution is that this solution requires provision of a full stack of traffic routing proxies toward all the nodes of the cloud application platform as a prerequisite. This is not only an expensive solution, but also is not a practical solution when considering the cost of the migration.

Another current solution is distribution of application runtime of the cloud application platform to the container orchestration platform. This distribution of application runtime allows the container orchestration platform to manage virtual machines of the cloud application platform just as pods of the container orchestration platform. However, this solution does not allow the container orchestration platform to recognize and, therefore, manage customer applications running on the virtual machines of the cloud application platform. As a result, during application migration using this solution, the container orchestration platform is unaware of customer applications still running on the virtual machines of the cloud application platform.

SUMMARY

According to one illustrative embodiment, a computer-implemented method for managing application migration is provided. A computer invokes an application programming interface (API) server on a controller node of a first computing platform to update a configuration map of a reverse proxy on a worker node of the first computing platform for the reverse proxy to route user service requests corresponding to unmigrated applications of a set of applications from the first computing platform to a second computing platform to maintain liveness of the unmigrated applications during migration of the set of applications from the second computing platform to the first computing platform. The computer invokes the API server on the controller node to build an image for an application of the set of applications on the second computing platform to be migrated to the first computing platform based on source code of the application obtained from the second computing platform. The computer invokes the API server on the controller node to generate a pod on the worker node of the first computing platform to perform a workload of the application using the image of the application built by the API server. The computer invokes the API server on the controller node to update a service on the worker node to select the pod on the worker node performing the workload of the application to complete migration of the application from the second computing platform to the first computing platform. According to other illustrative embodiments, a computer system and computer program product for managing application migration are provided.

As a result, the illustrative embodiments provide a technical effect and practical application in the field of application migration by enabling migration of a set of applications with continuous liveness and integrity of each application in the set of applications during the entire migration process without service interruption. Thus, a user requesting a service provided by any of the customer applications in the set being migrated will not experience an interruption in service during the migration process.

The illustrative embodiments also permissively invoke the API server on the controller node to update the configuration map of the reverse proxy on the worker node by removing information corresponding to the application from the configuration map to stop the reverse proxy from routing user service requests corresponding to the application from the first computing platform to the second computing platform during migration of the set of applications because the application has been migrated. Further, the illustrative embodiments permissively invoke the second computing platform to delete the application from the set of applications on the second computing platform. As a result, the illustrative embodiments eliminate any possibility of requesting the service corresponding to the deleted application from the second computing platform after migration of the application to the first computing platform.

DETAILED DESCRIPTION

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

Figure 1:
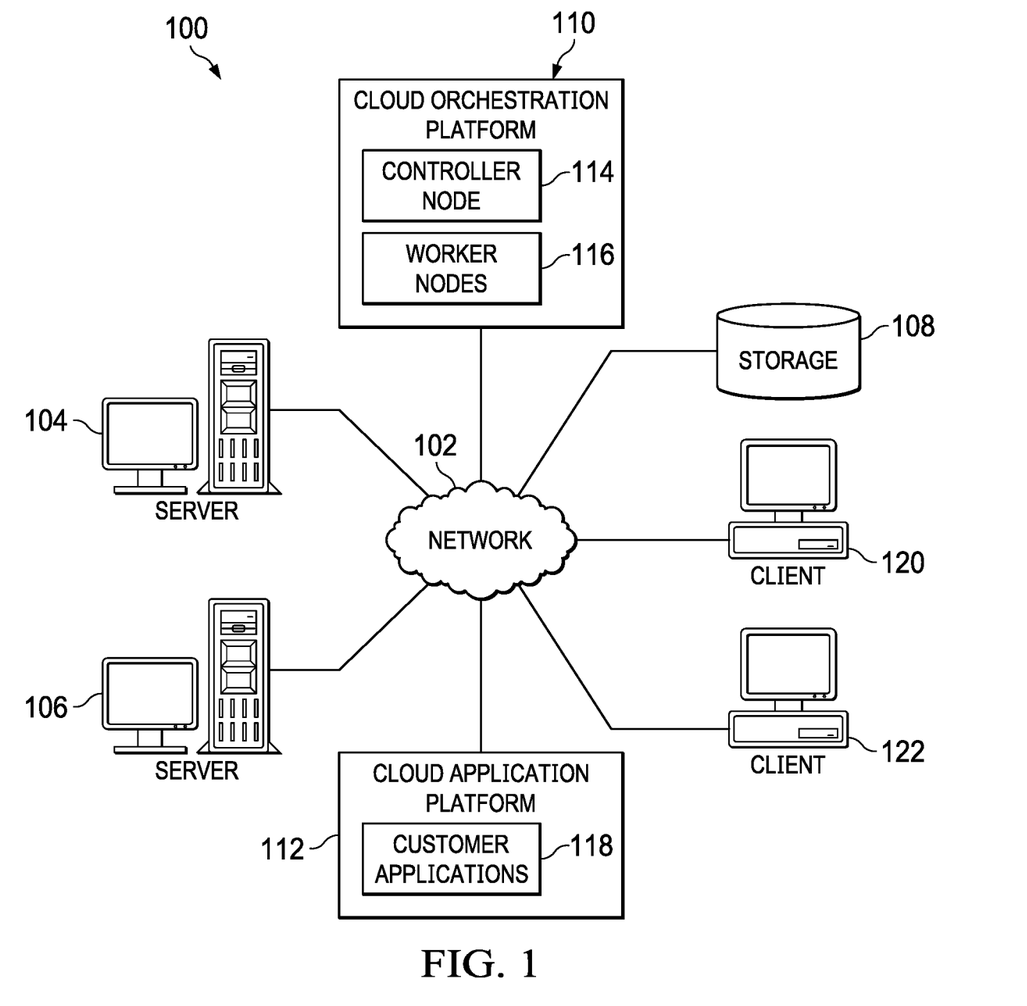
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108, container orchestration platform 110, and cloud application platform 112. Server 104 and server 106 may be, for example, server computers with high-speed connections to network 102. Also, server 104 and server 106 may each represent a cluster of servers in one or more data centers. Alternatively, server 104 and server 106 may each represent multiple computing nodes in one or more cloud environments.

In addition, server 104 and server 106 provide application migration management services to customer entities. A customer entity may be, for example, an enterprise, company, business, organization, institution, agency, or the like. The customer entity utilizes a set of applications to provide a set of services to requesting client device users. The set of services may be, for example, banking services, financial services, healthcare services, educational services, governmental services, entertainment services, insurance services, data services, transactional services, or the like.

Server 104 and server 106 perform the application migration management services by migrating the set of applications, such as customer applications 118, corresponding to the customer entity from cloud application platform 112 to container orchestration platform 110 while maintaining continuous liveness and integrity of the set of customer entity applications during the migration process. Liveness and integrity mean that each customer application in the set of customer applications that is being migrated is able to continuously provide its corresponding service at its intended service level with data integrity throughout the entire migration process without experiencing any downtime or service interruption to requesting client device users.

Cloud application platform 112 may be, for example, a Platform as a Service (PaaS) architecture or environment, such as Cloud Foundry® or the like. Cloud application platform 112 runs customer applications 118 in any programming language over a variety of cloud service providers. This multi-cloud environment allows customer entities to use cloud application platform 112 to run specific application workloads. Cloud application platform 112 determines how an application on a cloud is delivered to requesting client device users and works on an application level. Customer applications 118 may represent a plurality of different sets of customer applications corresponding to a same customer entity or a plurality of different customer entities. Also, customer applications 118 may represent any type of application capable of providing online services to requesting client device users.

Container orchestration platform 110 may be, for example, a Kubernetes® architecture or environment or the like. However, it should be understood that Kubernetes is meant as an example architecture only and not as a limitation on illustrative embodiments. Container orchestration platform 110 provides a platform for automating deployment, scaling, and operations of customer applications, such as customer applications 118. Container orchestration platform 110 also provides automatic deployment, scaling, and operations of pods, each pod comprising one or more containers, for running customer application workloads across cluster of worker nodes 116 (also known as host nodes or minions). While the term pod is generally used in the Kubernetes paradigm, the term as used herein is not limited to that environment but rather refers to any grouping of one or more containers where workloads are deployed and hold the running applications, libraries, and their dependencies. Controller node 114 corresponds to cluster of worker nodes 116 that performs customer application workloads. Controller node 114 receives and tracks service requests from client device users requesting performance of services corresponding to customer application workloads. Controller node 114, which is a main controlling unit of cluster of worker nodes 116, manages the cluster's customer application workloads and directs communication across the cluster. A worker node of worker nodes 116 is a machine, either physical or virtual, where containers (i.e., application workloads) are deployed. While the terms controller node and worker node are generally used in the Kubernetes paradigm, these terms as used herein are not limited to that environment but rather refer to any type of nodes that are capable of controlling and running customer application workloads.

Client 120 and client 122 also connect to network 102. Clients 120 and 122 are clients of worker nodes 116. In this example, clients 120 and 122 are shown as desktop or personal computers with wire communication links to network 102. However, it should be noted that clients 120 and 122 are examples only and may represent other types of data processing systems, such as, for example, network computers, laptop computers, handheld computers, smart phones, smart watches, smart televisions, smart vehicles, smart appliances, gaming devices, kiosks, and the like, with wire or wireless communication links to network 102. Users of clients 120 and 122 may utilize clients 120 and 122 to request and utilize the online services provided by customer applications 118 via worker nodes 116 during migration of set of customer applications 118 from cloud application platform 112 to container orchestration platform 110 by server 104 and/or server 106.

Storage 108 is a network storage device capable of storing any type of data in a structured format or an unstructured format. In addition, storage 108 may represent a plurality of network storage devices. Further, storage 108 may store identifiers and network addresses for a plurality of different computing platforms or environments, identifiers and network addresses for a plurality of client devices, identifiers for a plurality of client device users, identifiers and uniform resource locators (URLs) for a plurality of customer applications, configuration maps, and the like. Furthermore, storage 108 may store other types of data, such as authentication or credential data that may include usernames, passwords, and the like associated with system administrators and client device users, for example.

In addition, it should be noted that network data processing system 100 may include any number of additional servers, container orchestration platforms, cloud application platforms, clients, storage devices, and other devices not shown. Program code located in network data processing system 100 may be stored on a computer-readable storage medium or a set of computer-readable storage media and downloaded to a computer or other data processing device for use. For example, program code may be stored on a computer-readable storage medium on server 104 and downloaded to container orchestration platform 110 and cloud application platform 112 over network 102 for use on container orchestration platform 110 and cloud application platform 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
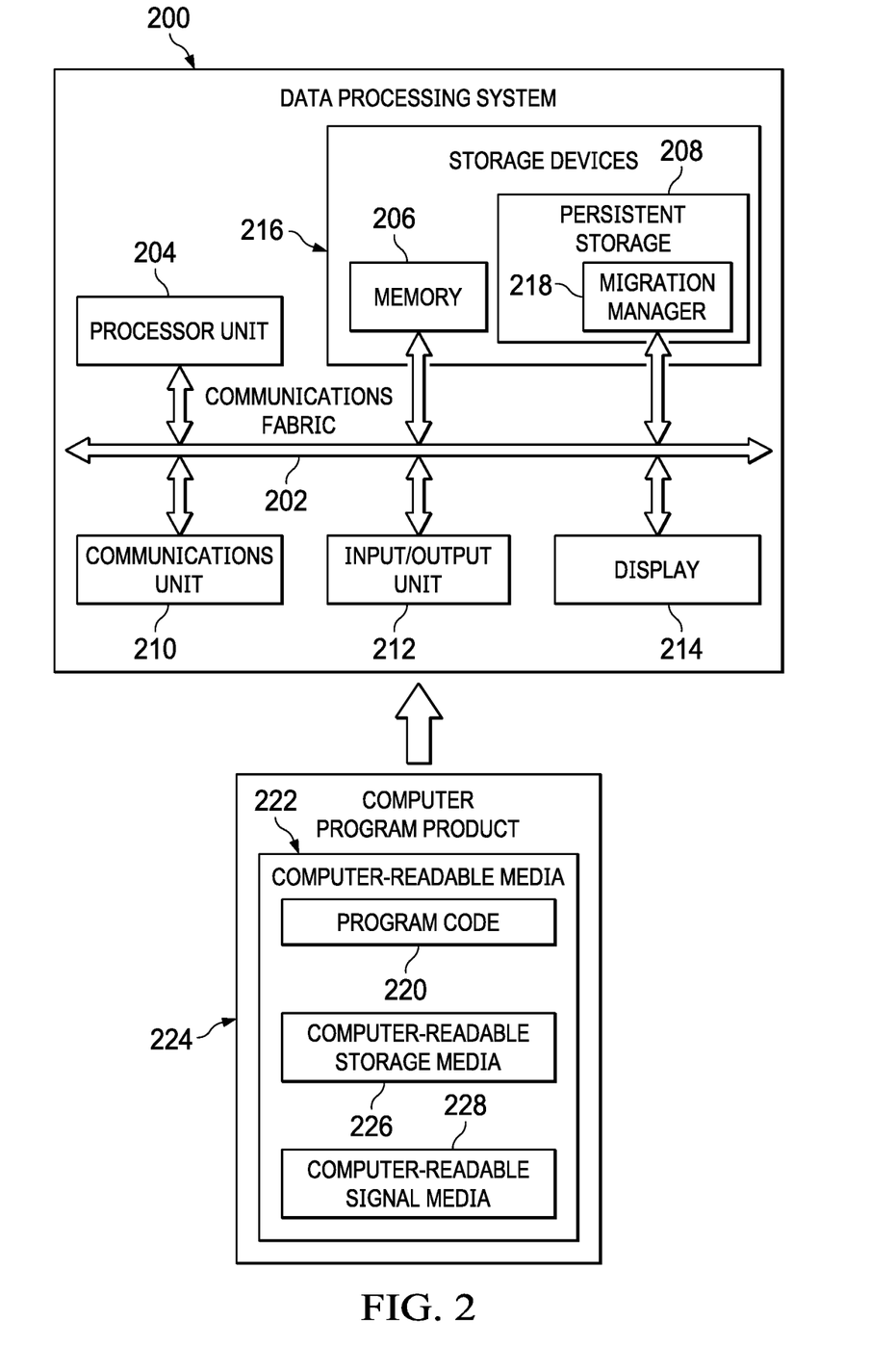
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer-readable program code or instructions implementing the application migration management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores migration manager 218. However, it should be noted that even though migration manager 218 is illustrated as residing in persistent storage 208, in an alternative illustrative embodiment, migration manager 218 may be a separate component of data processing system 200. For example, migration manager 218 may be a hardware component coupled to communication fabric 202 or a combination of hardware and software components. In another alternative illustrative embodiment, a first set of components of migration manager 218 may be located in data processing system 200 and a second set of components of migration manager 218 may be located in a second data processing system, such as, for example, server 106 in FIG. 1.

Migration manager 218 controls the process of migrating a set of applications, such as, for example, customer applications 118 in FIG. 1, which corresponding to a particular customer entity, from a cloud application platform, such as, for example, cloud application platform 112 in FIG. 1, to a container orchestration platform, such as, for example, container orchestration platform 110 in FIG. 1, while maintaining continuous liveness and integrity of the set of customer applications during the migration process. Migration manager 218 first exposes existing services of the set of customer applications residing on the cloud application platform to requesting client device users via the container orchestration platform and then migrates the set of customer applications to the container orchestration platform.

Migration manager 218 invokes an application programming interface (API) manager of the cloud application platform to call for and receive the context (e.g., identifier, URL, and the like) of each customer application of the set of customer applications, which is hosted by the cloud application platform, to be migrated to the container orchestration platform. Migration manager 218 then invokes an API server of the container orchestration platform to generate a service for the set of customer applications that is to be migrated from the cloud application platform to the container orchestration platform. While the term API server is generally used in the Kubernetes paradigm, the term as used herein is not limited to that environment but rather refers to any type of component that can provide both internal and external interfaces for the container orchestration platform and generate a service for customer applications. Migration manager 218 also selects a reverse proxy on a worker node of the container orchestration platform that is to run the set of customer applications after migration and updates a configuration of the reverse proxy using a configuration map so that the reverse proxy forwards service connections from the container orchestration platform to the cloud application platform for unmigrated customer applications in the set of customer applications until all of the cloud applications in the set are migrated to the container orchestration platform. A configuration map binds configuration files, command-line arguments, environment variables, port numbers, and other configuration artifacts to a pod's containers and system components at runtime. The configuration map enables separation of configurations from pods and system components, which helps keep application workloads portable. This makes their configurations easier to change and manage and prevents hardcoding configuration data to pod specifications.

Afterward, migration manager 218 migrates or deploys the set of customer applications to the container orchestration platform from the cloud application platform one by one. Migration manager 218 invokes the API manager of the cloud application platform to get source code and existing image of one customer application in the set of customer applications to be migrated. Migration manager 218 builds an image for that particular customer application based on at least one of the received source code or existing image. Migration manager 218 uses the built image to generate a pod on the worker node to perform a workload of that particular customer application being migrated to the container orchestration platform. Migration manager 218 then removes the relevant information corresponding to that particular customer application from the configuration map of the reverse proxy to stop the reverse proxy from forwarding service connections for that particular customer application from the container orchestration platform to the cloud application platform in response to completing migration of that particular customer application. Migration manager 218 then repeats the same process for the next customer application in the set of customer applications to be migrated.

As a result, data processing system 200 operates as a special purpose computer system in which migration manager 218 in data processing system 200 enables the migration of customer applications from the cloud application platform to the container orchestration platform while maintaining continuous liveness and integrity of the customer applications during the entire migration process. In particular, migration manager 218 transforms data processing system 200 into a special purpose computer system as compared to currently available general computer systems that do not have migration manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, short-wave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
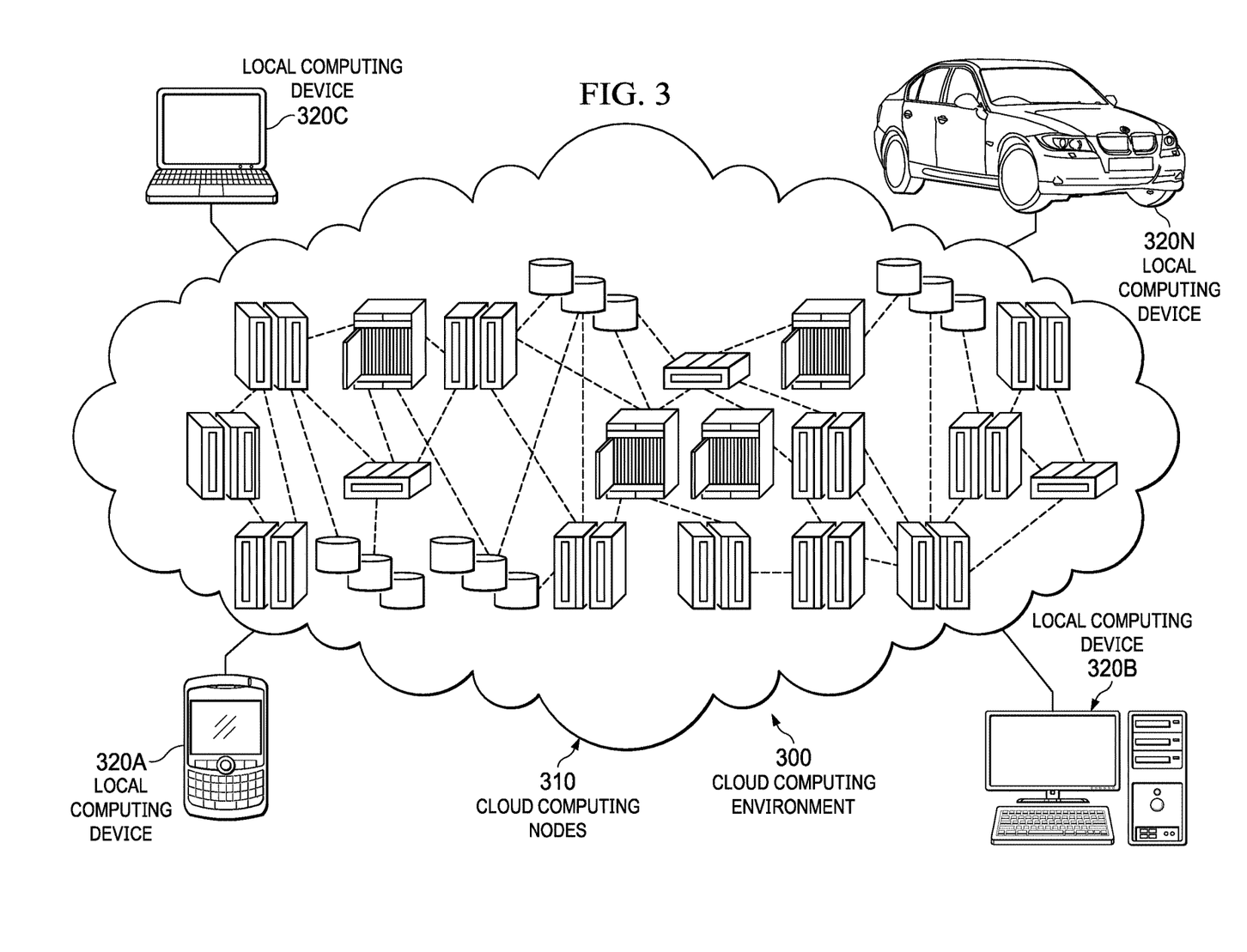
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 120 and 122 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
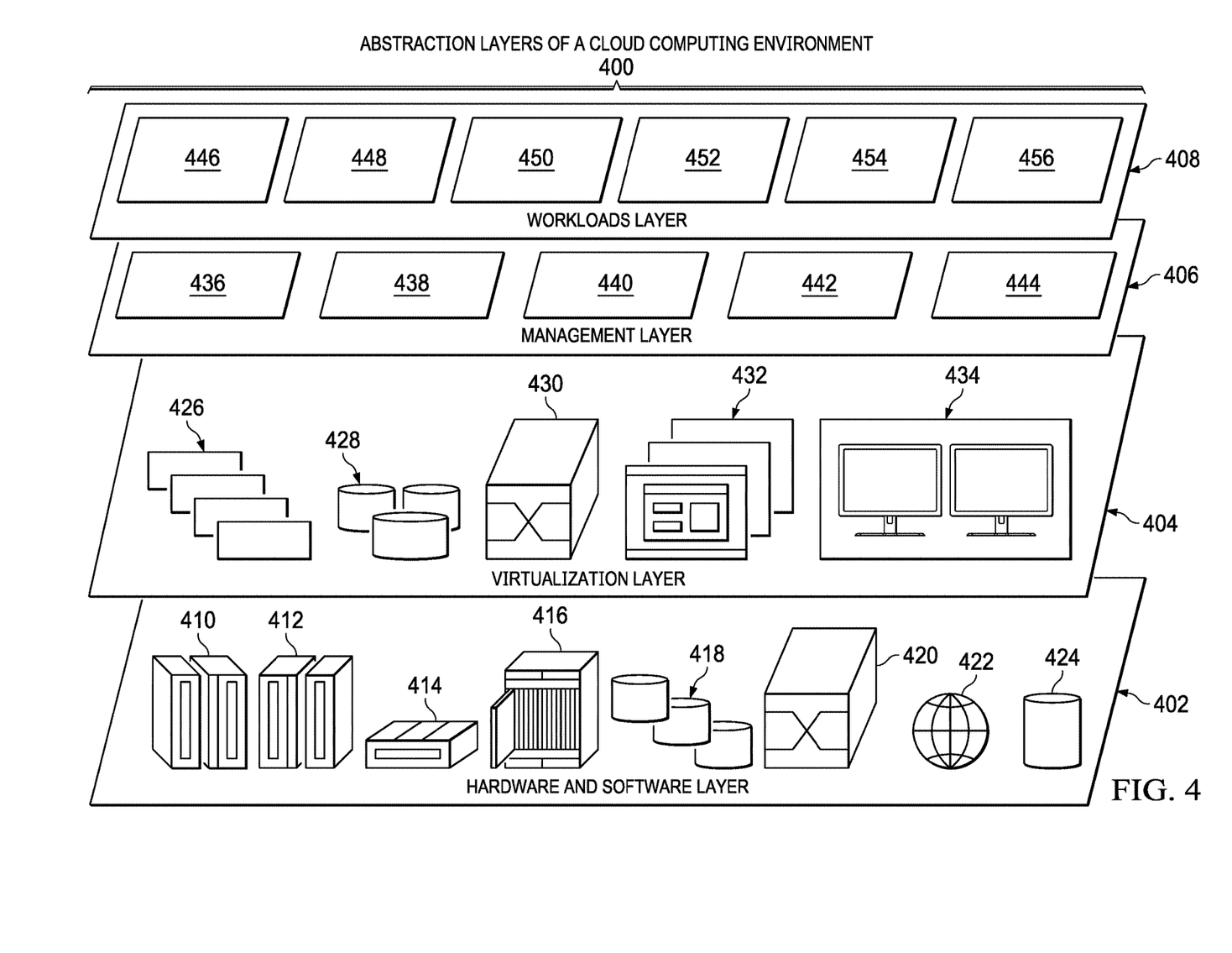
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and application migration management 456.

Figure 5:
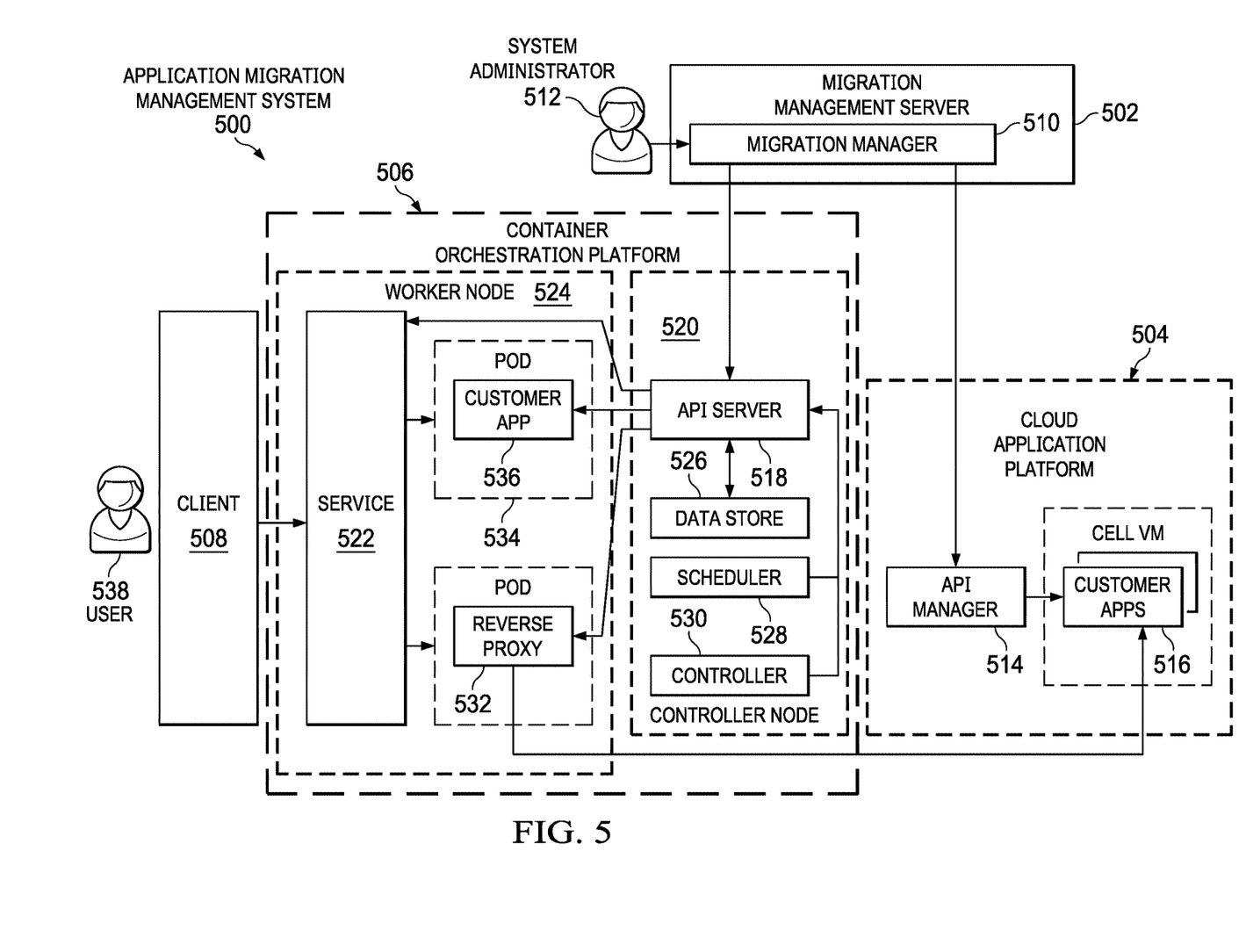
FIG. 5 is a diagram illustrating an example of an application migration management system in accordance with an illustrative embodiment.

With reference now to FIG. 5, a diagram illustrating an example of an application migration management system is depicted in accordance with an illustrative embodiment. Application migration management system 500 may be implemented in a network of data processing systems, such as network data processing system 100 in FIG. 1, or a cloud computing environment, such as cloud computing environment 300 in FIG. 3. Application migration management system 500 is a system of hardware and software components for migrating a set of applications corresponding to a customer entity from a cloud application platform to a container orchestration platform while maintaining continuous liveness and integrity of the set of customer entity applications during the entire migration process.

In this example, application migration management system 500 includes migration management server 502, cloud application platform 504, container orchestration platform 506, and client 508. Migration management server 502 may be, for example, server 104 in FIG. 1, data processing system 200 in FIG. 2, or a cloud computing node of cloud computing nodes 310 in FIG. 3. Migration management server 502 includes migration manager 510, such as, for example, migration manager 218 in FIG. 2. Migration manager 510 controls the process of application migration from one computing platform, architecture, or environment to another.

System administrator 512 triggers the application migration process using migration manager 510. In response, migration manager 510 invokes API manager 514 to obtain the identifier and URL of each customer application in customer applications 516. Customer applications 516 may be, for example, customer applications 118 in FIG. 1. Customer applications 516 represent a set of customer applications corresponding to a particular customer entity that wants to migrate customer applications 516 from cloud application platform 504 to container orchestration platform 506. Cloud application platform 504 and container orchestration platform 506 may be, for example, cloud application platform 112 and container orchestration platform 110 in FIG. 1, respectively.

After obtaining the identifier and URL of each customer application in customer applications 516, migration manager 510 invokes API server 518 on controller node 520 of container orchestration platform 506 to generate service 522 corresponding to customer applications 516 on worker node 524 of container orchestration platform 506 using the identifier and URL of each customer application in customer applications 516. Controller node 520 and worker node 524 may be, for example, controller node 114 and a worker node of worker nodes 116 in FIG. 1, respectively.

In addition to API server 518, controller node 520 also includes data store 526, scheduler 528, and controller 530, which comprise the control plane of controller node 520. Data store 526 contains configuration data of a cluster of worker nodes, which includes worker node 524, representing the overall state of the cluster at any given time. API server 518 provides internal and external interfaces for controller node 520. API server 518 processes and validates resource availability requests and updates state of API objects in data store 526, thereby allowing customer entities to configure workloads and containers across worker nodes in the cluster. Scheduler 528 selects which worker node an unscheduled pod runs on, based on resource availability of respective worker nodes. A pod is the basic unit managed by scheduler 528. Scheduler 528 tracks resource utilization on each worker node to ensure that a workload is not scheduled in excess of available resources. Controller 530 is a reconciliation loop that drives actual cluster state toward the desired cluster state, communicating with API server 518 to create, update, and delete the resources controller 530 manages (e.g., pods, service endpoints, and the like).

Further, migration manager 510 invokes API server 518 to update a configuration map of reverse proxy 532 on worker node 524 to cause reverse proxy 532 to forward requests received from user 538 via client 508 for service 522 corresponding to unmigrated customer applications of customer applications 516 from container orchestration platform 506 to cloud application platform 504 to continue application liveness and integrity of the unmigrated customer applications during migration of customer applications 516. User 538 may represent a plurality of different users requesting service 522. Client 508 may be, for example, client 120 in FIG. 1.

Afterward, migration manager 510 starts to migrate customer applications 516 one by one to container orchestration platform 506. Migration manager 510 invokes API manager 514 to obtain the source code and existing image of one customer application in customer applications 516. In addition, migration manager 510 invokes API server 518 to build a new image for that customer application based on at least one of the obtained source code or existing image of that customer application.

Migration manager 510 then invokes API server 518 to generate pod 534 on worker node 524 to perform a workload corresponding to that customer application (i.e., customer application 536) using the built new image for customer application 536. Customer application 536 represents a migrated customer application of customer applications 516. Furthermore, migration manager 510 invokes API server 518 to update service 522 to select pod 534 performing the workload of customer application 536. Moreover, migration manager 510 invokes API server 518 to update the configuration map of reverse proxy 532 by removing information (e.g., label) corresponding to customer application 536 from the configuration map to stop reverse proxy 532 from forwarding service requests received from user 538 via client 508 for service 522 corresponding to customer application 536 because customer application 536 has been migrated to container orchestration platform 506. In addition, migration manager 510 invokes API manager 514 to delete customer application 536 from customer applications 516 after migration of customer application 536 to container orchestration platform 506 has been completed.

Afterward, migration manager 510 determines whether more of customer applications 516 still need to be migrated from cloud application platform 504 to container orchestration platform 506. If more customer applications still need to be migrated, then migration manager 510 selects another of customer applications 516 for migration and performs the same process as above for each respective customer application to be migrated. After completing migration of all of customer applications 516 to container orchestration platform 506, migration manager 510 terminates the migration process.

As a result, illustrative embodiments enable migration of a set of customer applications with continuous liveness and integrity of each customer application in the set of customer applications during the migration process even though the time period for migrating all of the customer applications in the set is protracted. In other words, a user requesting a service provided by any of the customer applications in the set being migrated will not experience an interruption in service during the migration process. In addition, illustrative embodiments to not require customer entities to make any changes in the settings of the cloud application platform. Further, in the container orchestration platform, illustrative embodiments only need a minimal number of resources to accomplish traffic forwarding for unmigrated customer applications in the set during the migration process.

Thus, illustrative embodiments provide one or more technical solutions that overcome a technical problem with maintaining liveliness and integrity of applications during migration from one computing platform, infrastructure, or environment to another without service interruption to requesting users. As a result, these one or more technical solutions provide a technical effect and practical application in the field of application migration.

Figure 6A:
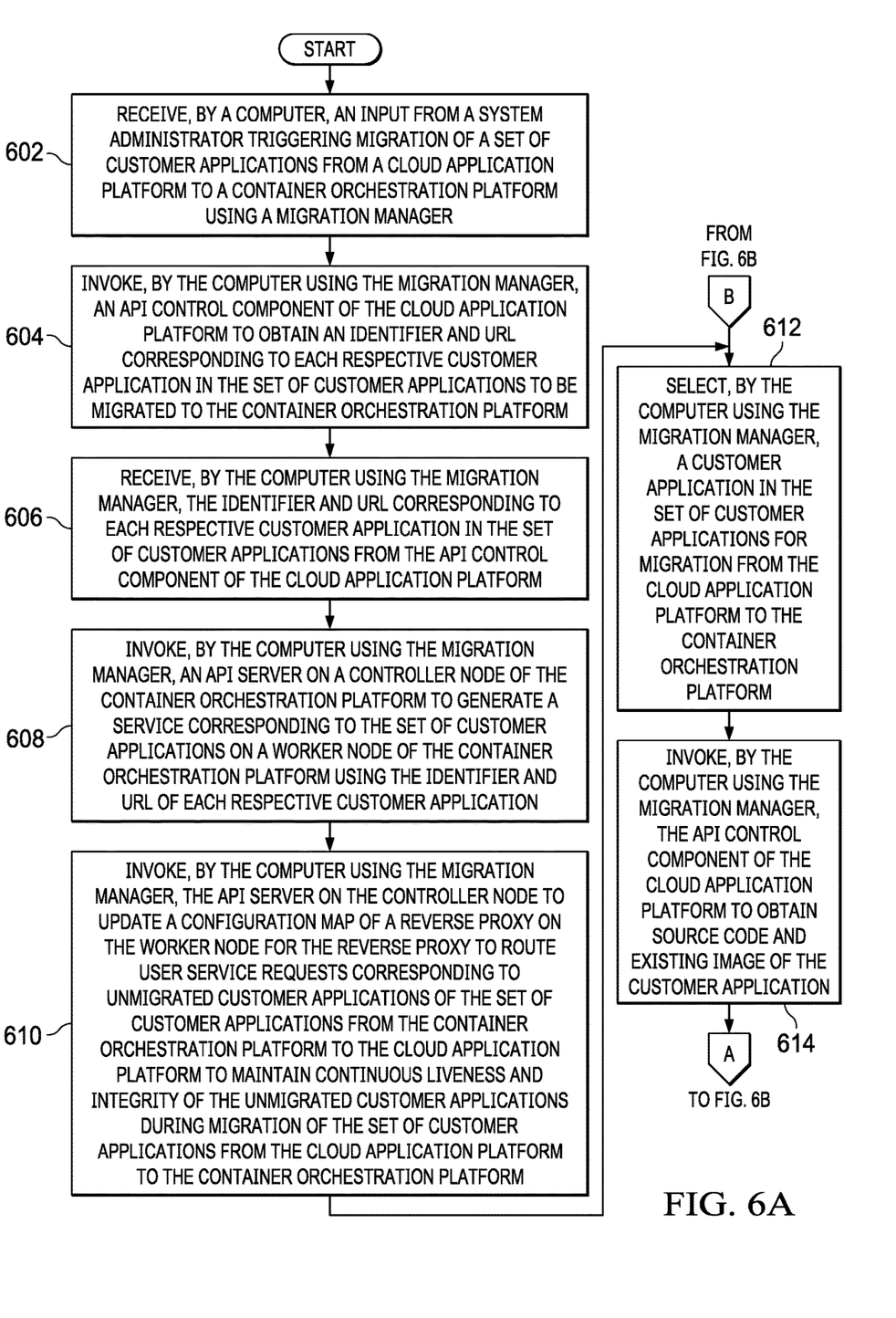
FIGS. 6A-6B are a flowchart illustrating a process for managing migration of customer applications from a cloud application platform to a container orchestration platform in accordance with an illustrative embodiment.
Figure 6B:
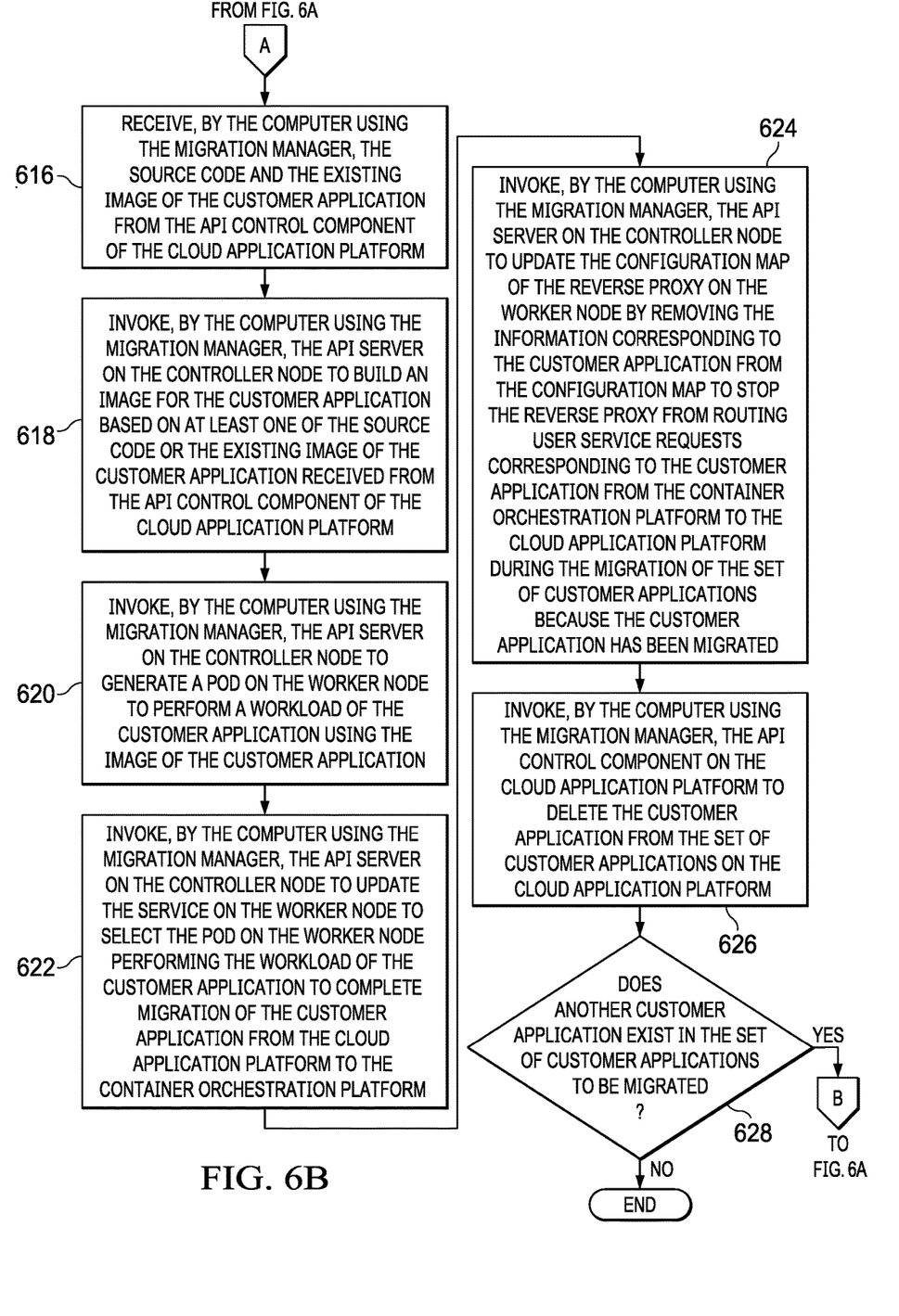

With reference now to FIGS. 6A-6B, a flowchart illustrating a process for managing migration of customer applications from a cloud application platform to a container orchestration platform is shown in accordance with an illustrative embodiment. The process shown in Figure FIGS. 6A-6B may be implemented in a computer, such as, for example, server 104 in FIG. 1, data processing system 200 in FIG. 2, a cloud computing node of cloud computing nodes 310 in FIG. 3, or migration management server 502 in FIG. 5. For example, the process shown in FIGS. 6A-6B may be implemented in migration manager 218 in FIG. 2 or migration manager 510 in FIG. 5.

The process begins when the computer receives an input from a system administrator triggering migration of a set of customer applications from a cloud application platform to a container orchestration platform using a migration manager (step 602). In response to receiving the input, the computer, using the migration manager, invokes an API manager of the cloud application platform to obtain an identifier and URL corresponding to each respective customer application in the set of customer applications to be migrated to the container orchestration platform (step 604). Afterward, the computer, using the migration manager, receives the identifier and URL corresponding to each respective customer application in the set of customer applications from the API manager of the cloud application platform (step 606).

The computer, using the migration manager, invokes an API server on a controller node of the container orchestration platform to generate a service corresponding to the set of customer applications on a worker node of the container orchestration platform using the identifier and URL of each respective customer application (step 608). In addition, the computer, using the migration manager, invokes the API server on the controller node to update a configuration map of a reverse proxy on the worker node for the reverse proxy to route user service requests corresponding to unmigrated customer applications of the set of customer applications from the container orchestration platform to the cloud application platform to maintain continuous liveness and integrity of the unmigrated customer applications during migration of the set of customer applications from the cloud application platform to the container orchestration platform (step 610).

Further, the computer, using the migration manager, selects a customer application in the set of customer applications for migration from the cloud application platform to the container orchestration platform (step 612). The computer, using the migration manager, invokes the API manager of the cloud application platform to obtain source code and existing image of the customer application (step 614). Subsequently, the computer, using the migration manager, receives the source code and the existing image of the customer application from the API manager of the cloud application platform (step 616).

The computer, using the migration manager, invokes the API server on the controller node to build an image for the customer application based on at least one of the source code or the existing image of the customer application received from the API manager of the cloud application platform (step 618). Furthermore, the computer, using the migration manager, invokes the API server on the controller node to generate a pod on the worker node to perform a workload of the customer application using the image of the customer application (step 620). Moreover, the computer, using the migration manager, invokes the API server on the controller node to update the service on the worker node to select the pod on the worker node performing the workload of the customer application to complete migration of the customer application from the cloud application platform to the container orchestration platform (step 622).

In addition, the computer, using the migration manager, invokes the API server on the controller node to update the configuration map of the reverse proxy on the worker node by removing information corresponding to the customer application from the configuration map to stop the reverse proxy from routing user service requests corresponding to the customer application from the container orchestration platform to the cloud application platform during the migration of the set of customer applications because the customer application has been migrated (step 624). Further, the computer, using the migration manager, invokes the API manager on the cloud application platform to delete the customer application from the set of customer applications on the cloud application platform (step 626).

Afterward, the computer, using the migration manager, makes a determination as to whether another customer application exists in the set of customer applications to be migrated (step 628). If the computer, using the migration manager, determines that another customer application does exist in the set of customer applications to be migrated, yes output of step 628, then the process returns to step 612 where the computer, using the migration manager, selects another customer application from the set of customer applications to be migrated. If the computer, using the migration manager, determines that another customer application does not exist in the set of customer applications to be migrated, no output of step 628, then the process terminates thereafter.

Thus, illustrative embodiments of the present invention provide a computer-implemented method, computer system, and computer program product for migrating a set of applications corresponding to a customer entity from a cloud application platform to a container orchestration platform while maintaining continuous liveness and integrity of the set of customer entity applications during the migration process. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing application migration, the computer-implemented method comprising:

invoking, by a computer, an application programming interface (API) server on a controller node of a first computing platform to update a configuration map of a reverse proxy on a worker node of the first computing platform for the reverse proxy to route user service requests corresponding to unmigrated applications of a set of applications from the first computing platform to a second computing platform to maintain liveness of the unmigrated applications during migration of the set of applications from the second computing platform to the first computing platform, wherein each application in the set of applications is able to continuously provide service at intended service level with data integrity throughout the migration process without experiencing interruptions;

invoking, by the computer, the API server on the controller node to build an image for an application of the set of applications on the second computing platform to be migrated to the first computing platform based on source code of the application obtained from the second computing platform;

invoking, by the computer, the API server on the controller node to generate a pod on the worker node of the first computing platform to perform a workload of the application using the image of the application built by the API server; and invoking, by the computer, the API server on the controller node to update a service on the worker node to select the pod on the worker node performing the workload of the application to complete migration of the application from the second computing platform to the first computing platform.

2. The computer-implemented method of claim 1 further comprising:

invoking, by the computer, the API server on the controller node to update the configuration map of the reverse proxy on the worker node by removing information corresponding to the application from the configuration map to stop the reverse proxy from routing user service requests corresponding to the application from the first computing platform to the second computing platform during migration of the set of applications because the application has been migrated.

3. The computer-implemented method of claim 1 further comprising:

invoking, by the computer, the second computing platform to delete the application from the set of applications on the second computing platform.

4. The computer-implemented method of claim 1 further comprising:
invoking, by the computer, the second computing platform to obtain an identifier and uniform resource locator (URL) corresponding to each respective application in the set of applications to be migrated to the first computing platform from the second computing platform in response to the computer receiving an input from a system administrator triggering migration of the set of applications from the second computing platform to the first computing platform; and
invoking, by the computer, the API server on the controller node to generate the service corresponding to the set of applications on the worker node of the first computing platform using the identifier and URL of each respective application.

5. The computer-implemented method of claim 1 further comprising:
selecting, by the computer, the application in the set of applications for migration from the second computing platform to the first computing platform; and
invoking, by the computer, the second computing platform to obtain the source code of the application.

6. The computer-implemented method of claim 5 further comprising:
determining, by the computer, whether another application exists in the set of applications to be migrated; and
selecting, by the computer, another application from the set of applications to be migrated in response to determining that another application exists in the set of applications to be migrated.

7. The computer-implemented method of claim 1, wherein liveness means that each application in the set of applications that is being migrated is able to provide its corresponding service at its intended service level without experiencing any downtime or service interruption to requesting client device users during migration.

8. The computer-implemented method of claim 1, wherein the first computing platform is a container orchestration platform and the second computing platform is a cloud application platform.

9. A computer system for managing application migration, the computer system comprising:
a bus system;
a storage device connected to the bus system, wherein the storage device stores program instructions; and
a processor connected to the bus system, wherein the processor executes the program instructions to:
invoke an application programming interface (API) server on a controller node of a first computing platform to update a configuration map of a reverse proxy on a worker node of the first computing platform for the reverse proxy to route user service requests corresponding to unmigrated applications of a set of applications from the first computing platform to a second computing platform to maintain liveness of the unmigrated applications during migration of the set of applications from the second computing platform to the first computing platform, wherein each application in the set of applications is able to continuously provide service at intended service level with data integrity throughout the migration process without experiencing interruptions;
invoke the API server on the controller node to build an image for an application of the set of applications on the second computing platform to be migrated to the first computing platform based on source code of the application obtained from the second computing platform;
invoke the API server on the controller node to generate a pod on the worker node of the first computing platform to perform a workload of the application using the image of the application built by the API server; and
invoke the API server on the controller node to update a service on the worker node to select the pod on the worker node performing the workload of the application to complete migration of the application from the second computing platform to the first computing platform.

10. The computer system of claim 9, wherein the processor further executes the program instructions to:
invoke the API server on the controller node to update the configuration map of the reverse proxy on the worker node by removing information corresponding to the application from the configuration map to stop the reverse proxy from routing user service requests corresponding to the application from the first computing platform to the second computing platform during migration of the set of applications because the application has been migrated.

11. The computer system of claim 9, wherein the processor further executes the program instructions to:
invoke the second computing platform to delete the application from the set of applications on the second computing platform.

12. The computer system of claim 9, wherein the processor further executes the program instructions to:
invoke the second computing platform to obtain an identifier and uniform resource locator (URL) corresponding to each respective application in the set of applications to be migrated to the first computing platform from the second computing platform in response to receiving an input from a system administrator triggering migration of the set of applications from the second computing platform to the first computing platform; and
invoke the API server on the controller node to generate the service corresponding to the set of applications on the worker node of the first computing platform using the identifier and URL of each respective application.

13. The computer system of claim 9, wherein the processor further executes the program instructions to:
select the application in the set of applications for migration from the second computing platform to the first computing platform; and
invoke the second computing platform to obtain the source code of the application.

14. A computer program product for managing application migration, the computer program product comprising a computer-readable storage medium having program instructions embodied therewith, the program instructions executable by a computer to cause the computer to perform a method of:
invoking, by a computer, an application programming interface (API) server on a controller node of a first computing platform to update a configuration map of a reverse proxy on a worker node of the first computing platform for the reverse proxy to route user service requests corresponding to unmigrated applications of a set of applications from the first computing platform to a second computing platform to maintain liveness of the unmigrated applications during migration of the set of applications from the second computing platform to the first computing platform, wherein each application in the set of applications is able to continuously provide service at intended service level with data integrity throughout the migration process without experiencing interruptions;

invoking, by the computer, the API server on the controller node to build an image for an application of the set of applications on the second computing platform to be migrated to the first computing platform based on source code of the application obtained from the second computing platform;

invoking, by the computer, the API server on the controller node to generate a pod on the worker node of the first computing platform to perform a workload of the application using the image of the application built by the API server; and invoking, by the computer, the API server on the controller node to update a service on the worker node to select the pod on the worker node performing the workload of the application to complete migration of the application from the second computing platform to the first computing platform.

15. The computer program product of claim 14 further comprising:

invoking, by the computer, the API server on the controller node to update the configuration map of the reverse proxy on the worker node by removing information corresponding to the application from the configuration map to stop the reverse proxy from routing user service requests corresponding to the application from the first computing platform to the second computing platform during migration of the set of applications because the application has been migrated.

16. The computer program product of claim 14 further comprising:

invoking, by the computer, the second computing platform to delete the application from the set of applications on the second computing platform.

17. The computer program product of claim 14 further comprising:

invoking, by the computer, the second computing platform to obtain an identifier and uniform resource locator (URL) corresponding to each respective application in the set of applications to be migrated to the first computing platform from the second computing platform in response to the computer receiving an input from a system administrator triggering migration of the set of applications from the second computing platform to the first computing platform; and invoking, by the computer, the API server on the controller node to generate the service corresponding to the set of applications on the worker node of the first computing platform using the identifier and URL of each respective application.

18. The computer program product of claim 14 further comprising:

selecting, by the computer, the application in the set of applications for migration from the second computing platform to the first computing platform; and invoking, by the computer, the second computing platform to obtain the source code of the application.

19. The computer program product of claim 18 further comprising:

determining, by the computer, whether another application exists in the set of applications to be migrated; and selecting, by the computer, another application from the set of applications to be migrated in response to determining that another application exists in the set of applications to be migrated.

20. The computer program product of claim 14, wherein liveness means that each application in the set of applications that is being migrated is able to provide its corresponding service at its intended service level without experiencing any downtime or service interruption to requesting client device users during migration.

* * * * *